United States Patent
Li (10) Patent No.: US 9,420,561 B2
(45) Date of Patent: Aug. 16, 2016

(54) METHOD FOR OBTAINING CONFIGURATION DATA AND METHOD FOR PROVIDING CONFIGURATION DATA, BASE STATION DEVICE, AND NETWORK MANAGEMENT SYSTEM

(71) Applicant: Huawei Technologies Co., Ltd., Shenzhen (CN)

(72) Inventor: Hang Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/222,244

(22) Filed: Mar. 21, 2014

(65) Prior Publication Data

US 2014/0206336 A1    Jul. 24, 2014

Related U.S. Application Data

(63) Continuation of application No. PCT/CN2012/081810, filed on Sep. 24, 2012.

(30) Foreign Application Priority Data

Sep. 22, 2011  (CN) .......................... 2011 1 0283445

(51) Int. Cl.
*H04M 3/00* (2006.01)
*H04W 64/00* (2009.01)
(Continued)

(52) U.S. Cl.
CPC ............ *H04W 64/003* (2013.01); *H04W 24/02* (2013.01); *H04W 88/08* (2013.01)

(58) Field of Classification Search
USPC ............. 455/419, 456.1, 456.2, 456.3, 456.4, 455/456.5, 456.6
See application file for complete search history.

(56) References Cited

U.S. PATENT DOCUMENTS

| 5,870,610 A | 2/1999 | Beyda |
| 6,041,228 A | 3/2000 | Niska et al. |

(Continued)

FOREIGN PATENT DOCUMENTS

| CN | 1278988 A | 1/2001 |
| CN | 1285935 A | 2/2001 |

(Continued)

OTHER PUBLICATIONS

Alexander et al., "DHCP Options and BOOTP Vendor Extensions" Network Working Group, Mar. 1997, 36 pages.

(Continued)

*Primary Examiner* — Vladimir Magloire
*Assistant Examiner* — Sayed T Zewari
(74) *Attorney, Agent, or Firm* — Brinks Gilson & Lione (57) ABSTRACT

Embodiments of the present invention provide a method for obtaining configuration data and a method for providing configuration data, a base station device, and a network management system, where the method for obtaining configuration data includes: obtaining, by the base station device, site identifier information of a site where the base station device is located; sending, by the base station device, the site identifier information to a network management system; and receiving, by the base station device, configuration data corresponding to the site identifier information and sent by the network management system, where the configuration data is obtained by the network management system according to a correspondence between the site identifier information and the configuration data.

10 Claims, 5 Drawing Sheets

(51) Int. Cl.
  *H04W 24/02* (2009.01)
  *H04W 88/08* (2009.01)

(56) References Cited

U.S. PATENT DOCUMENTS

| | | | |
|---|---|---|---|
| 6,075,997 A | 6/2000 | Lindqvist et al. | |
| 8,089,400 B1 * | 1/2012 | Fang et al. | 342/357.42 |
| 2002/0187793 A1 | 12/2002 | Papadimitriou et al. | |
| 2007/0097939 A1 * | 5/2007 | Nylander et al. | 370/338 |
| 2009/0047945 A1 | 2/2009 | Zhang et al. | |
| 2012/0084415 A1 * | 4/2012 | Hu et al. | 709/221 |

FOREIGN PATENT DOCUMENTS

| | | |
|---|---|---|
| CN | 1286003 A | 2/2001 |
| CN | 1714590 A | 12/2005 |
| CN | 101031134 A | 9/2007 |
| CN | 101141418 A | 3/2008 |
| CN | 101197713 A | 6/2008 |
| CN | 101437327 A | 5/2009 |
| CN | 101836474 A | 9/2010 |
| CN | 101909285 A | 12/2010 |
| CN | 101980562 A | 2/2011 |

OTHER PUBLICATIONS

Droms, "Dynamic Host Configuration Protocol" Network Working Group, Mar. 1997, 48 pages.

Wilmer, "Clarifications and Extensions for the Bootstrap Protocol" Network Working Group, Oct. 1993, 23 pages.

LTE, "$3^{rd}$ Generation Partnership Project; Technical Specification Group Services and System Aspects; Telecommunication management; Self-configuration of network elements; Concepts and requirements" (Release 10) 3GPP TS 32.501, V10.0.0, Mar. 2011, 17 pages.

* cited by examiner

| Option 43 | Length | Vendor specific option |
|---|---|---|
| 1 Byte | 1 Byte | 0~255 bytes |

| Information item 1 | | |
|---|---|---|
| Code | Length | Data |
| 1 | 1 Byte | ESN |

| Information item 2 | | |
|---|---|---|
| Code | Length | Data |
| 201 | 1 Byte | GPS information |

| Option 43 | Length | Vendor specific option |
|---|---|---|
| 1 Byte | 1 Byte | 0~255 bytes |

| Information item 1 | | |
|---|---|---|
| Code | Length | Data |
| 1 | 1 Byte | ESN |

| Information item 2 | | |
|---|---|---|
| Code | Length | Data |
| 202 | 1 Byte | Site identifier |

METHOD FOR OBTAINING CONFIGURATION DATA AND METHOD FOR PROVIDING CONFIGURATION DATA, BASE STATION DEVICE, AND NETWORK MANAGEMENT SYSTEM

CROSS-REFERENCE TO RELATED APPLICATIONS

This application is a continuation of International Application No. PCT/CN2012/081810, filed on Sep. 24, 2012, which claims priority to Chinese Patent Application No. 201110283445.1, filed on Sep. 22, 2011, both of which are hereby incorporated by reference in their entireties.

FIELD OF THE INVENTION

Embodiments of the present invention relate to data processing technologies, and in particular, to a method for obtaining configuration data and a method for providing configuration data, a base station device, and a network management system.

BACKGROUND OF THE INVENTION

In a radio communications system, base station devices in a site may obtain, in an initial commissioning stage, their respective configuration data of the base station devices that is sent by a network management system. In the prior art, an on-site operator may report an equipment serial number (ESN) of a base station device and site information of a site where the base station device is located to a manager of the network management system (for example, an operation support system (OSS), and then the manager associates configuration data corresponding to the obtained site information with the base station device, so that the network management system sends the configuration data to the corresponding base station device.

However, the foregoing manual operations are error-prone and take a long operation time, thereby reducing the reliability and efficiency of the base station device in obtaining the configuration data.

SUMMARY OF THE INVENTION

Embodiments of the present invention provide a method for obtaining configuration data and a method for providing configuration data, a base station device, and a network management system, so as to improve the reliability and efficiency of the base station device in obtaining configuration data.

In one aspect, a method for obtaining configuration data is provided, including:

obtaining, by a base station device, site identifier information of a site where the base station device is located;

sending, by the base station device, the site identifier information to a network management system; and receiving, by the base station device, configuration data corresponding to the site identifier information and sent by the network management system, where the configuration data is obtained by the network management system according to a correspondence between the site identifier information and the configuration data.

In another aspect, a method for providing configuration data is provided, including:

receiving, by a network management system, site identifier information of a site where a base station device is located that is sent by the base station device;

obtaining, by the network management system, configuration data corresponding to the site identifier information according to a correspondence between the site identifier information and the configuration data; and sending, by the network management system, the obtained configuration data to the base station device.

In another aspect, a base station device is provided, including:

an obtaining unit, configured to obtain site identifier information of a site where the base station device is located;

a sending unit, configured to send the site identifier information to a network management system; and a receiving unit, configured to receive configuration data corresponding to the site identifier information and sent by the network management system, where the configuration data is obtained by the network management system according to a correspondence between the site identifier information and the configuration data.

In another aspect, a network management system is provided, including:

a receiving unit, configured to receive site identifier information of a site where a base station device is located that is sent by the base station device;

an obtaining unit, configured to obtain configuration data corresponding to the site identifier information according to a correspondence between the site identifier information and the configuration data; and a sending unit, configured to send the configuration data obtained by the obtaining unit to the base station device.

It can be seen from the foregoing technical solutions that, the embodiments of the present invention can prevent the problem in the prior art that manual operations are error-prone and take a long operation time, thereby improving the reliability and efficiency of the base station device in obtaining the configuration data.

BRIEF DESCRIPTION OF THE DRAWINGS

To illustrate the technical solutions in the embodiments of the present invention or in the prior art more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION OF THE EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

The technical solutions provided by the embodiments of the present invention may be applied in various radio communication systems, such as a Global System for Mobile Communications (GSM), a General Packet Radio Service (GPRS) system, a Code Division Multiple Access (CDMA) system, a Wideband Code Division Multiple Access (WCDMA) system, a Time Division-Synchronous Code Division Multiple Access (TD-SCDMA) system, and a Long Term Evolution (LTE) system.

A base station device may be a base transceiver station (BTS) in the GSM system, the GPRS system, or the CDMA system, may also be a NodeB (NodeB) in the WCDMA system, and may further be an evolutional Node B (eNB or eNodeB) in the LTE system, which is not limited in the present invention.

Figure 1:
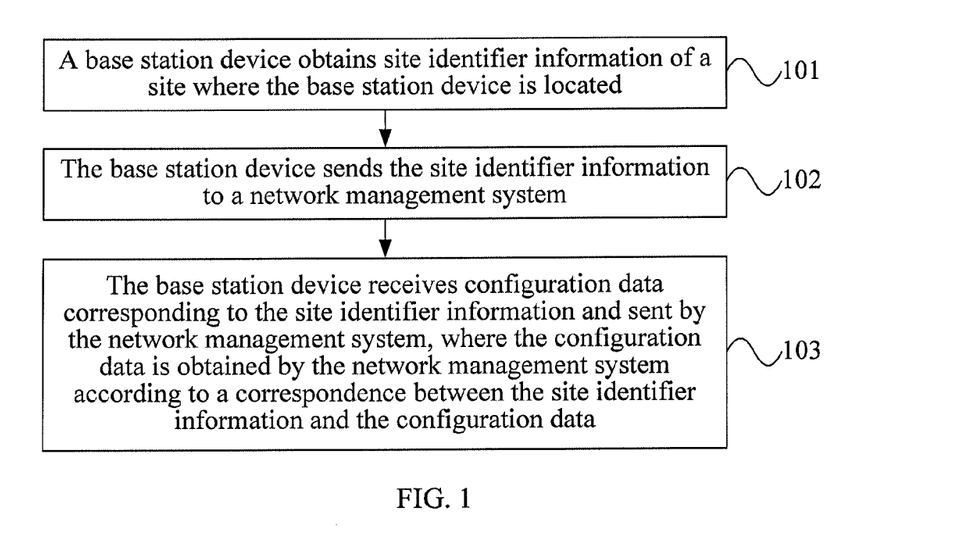
FIG. 1 is a schematic flowchart of a method for obtaining configuration data according to an embodiment of the present invention.

FIG. 1 is a schematic flowchart of a method for obtaining configuration data according to an embodiment of the present invention. As shown in FIG. 1, the method for obtaining configuration data in this embodiment may include the following steps:

101: A base station device obtains site identifier information of a site where the base station device is located.

For example, after the base station device is installed in the site, power on the base station, and execute step 101.

Optionally, the site identifier information may be Global Positioning System (GPS) information of the site and a device identifier of the base station device. Specifically, the base station device may obtain, through the GPS system installed on the base station device, the GPS information of the site where the base station device is located; and the base station device may obtain the device identifier of the base station device by reading information in a designated storage area (for example, a nonvolatile storage area such as a flash memory) on a hardware device in the base station device, for example, an ESN stored in an electrically-erasable programmable read-only memory (EEPROM) of a backplane in the base station device.

Optionally, the site identifier information may further be a site identifier of the site, where the site identifier of the site is pre-configured on the base station device. Specifically, an on-site operator may configure, through an input device, the pre-configured site identifier on a designated storage area (for example, a permanent storage area such as a hard disk) on the base station device in the site. For example, the on-site operator may input, through a barcode scanner, the site identifier pre-printed on a barcode (namely, a site identifier indicated by the barcode) to the designated storage area (for example, the permanent storage area such as a hard disk) on the base station device in the site; or the on-site operator may also write, through an auto-writing function in a storage device (for example, a USB), the site identifier pre-stored in the storage device to the designated storage area (for example, the permanent storage area such as a hard disk) on the base station device in the site. The base station device may obtain the site identifier of the site by reading information in the designated storage area on the base station device.

Optionally, the site identifier information may also be a site identifier of the site and a device identifier of the base station device, where the site identifier of the site is pre-configured on the base station device. Specifically, an on-site operator may configure, through an input device, the pre-configured site identifier on a designated storage area (for example, a permanent storage area such as a hard disk) on the base station device in the site. For example, the on-site operator may input, through a barcode scanner, the site identifier pre-printed on a barcode (namely, a site identifier indicated by the barcode) to the designated storage area on the base station device in the site; or the on-site operator may also write, through an auto-writing function in a storage device (for example, a USB), the site identifier pre-stored in the storage device to the designated storage area on the base station device in the site. The base station device may obtain the device identifier of the base station device by reading information in the designated storage area (for example, a nonvolatile storage area such as a flash memory) on the base station device.

102: The base station device sends the site identifier information to a network management system.

Optionally, the base station device may send the site identifier information to the network management system through a DHCP server. For example, the base station device sends a DHCP request message for requesting transmission data to the DHCP server, so as to obtain transmission data allocated by the DHCP server to the base station device, where the DHCP request message includes the site identifier information, so that the DHCP server sends the site identifier information to the network management system. For another example, the base station device may further send a DHCP request message for requesting transmission data to the DHCP server, so as to obtain transmission data allocated by the DHCP server to the base station device; and then send the site identifier information to the network management system by using the obtained transmission data. Specifically, the base station device may establish a transmission channel between the base station device and the network management system by using the obtained transmission data, and send the site identifier information to the network management system through the transmission channel.

The DHCP server and the network management system may be integrally deployed or separately deployed, which is not limited in this embodiment.

103: The base station device receives configuration data corresponding to the site identifier information and sent by the network management system, where the configuration data is obtained by the network management system according to a correspondence between the site identifier information and the configuration data.

The configuration data is needed by the base station device to work normally. Before the base station device is available, a manager may plan parameters of the base station device in the site according to the site, form the configuration data according to the planned parameters, and configure the configuration data in the network management system. The configuration data may include but is not limited to transmission data (for example, an IP address), wireless data (for example, a working frequency point), and device parameters (for example, a board slot or an interface rate).

In this embodiment, after obtaining the site identifier information of the site where the base station device is located, the base station device sends the obtained site identifier information to the network management system, so that the base station device receives the configuration data corresponding to the site identifier information, where the configuration data is obtained by the network management system according to the correspondence between the site identifier information and the configuration data and is sent by the network management system. Therefore, the following problem in the prior art can be prevented: manual operations are error-prone and take a long operation time, thereby improving the reliability and efficiency of the base station device in obtaining the configuration data.

Figure 2:
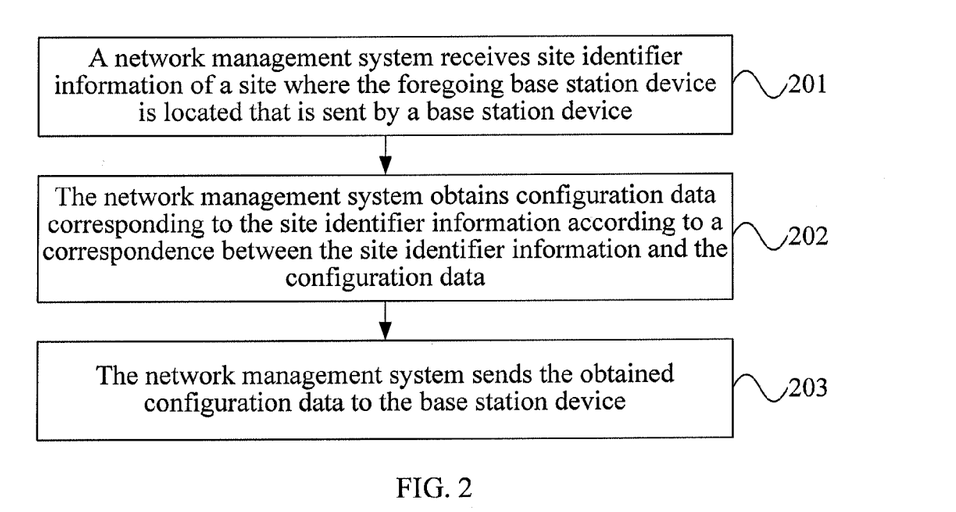
FIG. 2 is a schematic flowchart of a method for providing configuration data according to another embodiment of the present invention.

FIG. 2 is a schematic flowchart of a method for providing configuration data according to another embodiment of the present invention, and as shown in FIG. 2, the method for providing configuration data in this embodiment may include the following steps.

201: A network management system receives site identifier information of a site where a base station device is located that is sent by the base station device.

For example, after the base station device is installed in the site, power on the base station, and execute step 201.

Optionally, the site identifier information may be GPS information of the site and a device identifier of the base station device. Specifically, the base station device may obtain, through the GPS system installed on the base station device, the GPS information of the site where the base station device is located; and the base station device may obtain the device identifier of the base station device by reading information in a designated storage area (for example, a nonvolatile storage area such as a flash memory) on a hardware device in the base station device, for example, an ESN stored in an electrically-erasable programmable read-only memory (EE-PROM) of a backplane in the base station device.

Optionally, the site identifier information may further be a site identifier of the site, where the site identifier of the site is pre-configured on a designated storage area (for example, a permanent storage area such as a hard disk) on the base station device. Specifically, an on-site operator may configure, through an input device, the pre-configured site identifier on the designated storage area on the base station device in the site. For example, the on-site operator may input, through a barcode scanner, the site identifier pre-printed on a barcode (namely, the site identifier indicated by the barcode) to the designated storage area (for example, the permanent storage area such as a hard disk) on the base station device in the site, so that the base station device can obtain the site identifier of the site by reading information in the designated storage area on the base station device; or the on-site operator may also write, through an auto-writing function in a storage device (for example, a USB), the site identifier pre-stored in the storage device to the designated storage area (for example, the permanent storage area such as a hard disk) on the base station device in the site, so that the base station device can obtain the site identifier of the site by reading information in the designated storage area on the base station device.

Optionally, the site identifier information may also be a site identifier of the site and a device identifier of the base station device, where the site identifier of the site is pre-configured on a designated storage area (for example, a permanent storage area such as a hard disk) on the base station device. Specifically, an on-site operator may configure, through an input device, the pre-configured site identifier on the designated storage area on the base station device in the site. For example, the on-site operator may input, through a barcode scanner, the site identifier pre-printed on a barcode (namely, the site identifier indicated by the barcode) to the designated storage area (the permanent storage area such as a hard disk) on the base station device in the site, so that the base station device can obtain the site identifier of the site by reading information in the designated storage area on the base station device; or the on-site operator may also write, through an auto-writing function in a storage device (for example, a USB), the site identifier pre-stored in the storage device to the designated storage area (for example, the permanent storage area such as a hard disk) on the base station device in the site, so that the base station device can obtain the site identifier of the site by reading information in the designated storage area on the base station device. The base station device may obtain the device identifier of the base station device by reading information in the designated storage area (for example, a nonvolatile storage area such as a flash memory) on the base station device.

Optionally, the network management system may receive, through a DHCP server, the site identifier information sent by the base station device. For example, the network management system may receive the site identifier information sent by the DHCP server, where the site identifier information is included in a DHCP request message for requesting transmission data, sent by the base station device, and received by the DHCP server. For another example, the network management system may further receive the site identifier information sent by the base station device, where the site identifier information is sent by using transmission data that is obtained in the case that the base station device sends a DHCP request message for requesting transmission data to the DHCP server to obtain the transmission data allocated by the DHCP server to the base station device. Specifically, the base station device may establish a transmission channel between the base station device and the network management system by using the obtained transmission data, and send the site identifier information to the network management system through the transmission channel.

The DHCP server and the network management system may be integrally deployed or separately deployed, which is not limited in this embodiment.

202: The network management system obtains configuration data corresponding to the site identifier information according to a correspondence between the site identifier information and the configuration data.

The configuration data is needed by the base station device to work normally. Before the base station device is available, a manager may plan parameters of the base station device in the site according to the site, form the configuration data according to the planned parameters, and configure the configuration data in the network management system. The configuration data may include but is not limited to transmission data (for example, an IP address), wireless data (for example, a working frequency point), and device parameters (for example, a board slot or an interface rate).

203: The network management system sends the obtained configuration data to the base station device.

In this embodiment, after the base station device obtains the site identifier information of the site where the base station device is located, the network management system receives the obtained site identifier information sent by the base station device, obtains the configuration data corresponding to the site identifier information according to the correspondence between the site identifier information and the configuration data, and sends the configuration data to the base station device. Therefore, the following problem in the prior art can be prevented: manual operations are error-prone and take a long operation time, thereby improving the reliability and efficiency of the base station device in obtaining the configuration data.

To illustrate the method provided by the embodiment of the present invention more clearly, the case that the DHCP server and the network management system can be integrally deployed is taken as an example in the following.

Figure 3A:
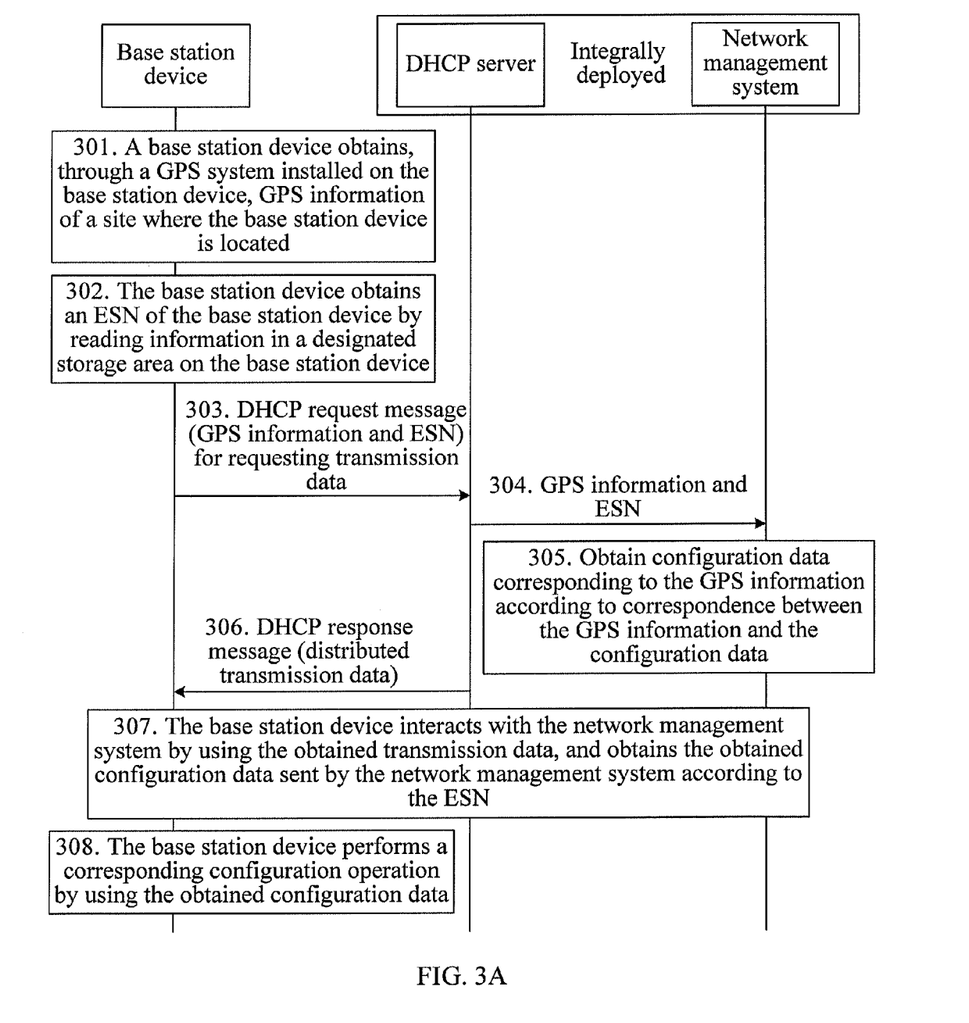
FIG. 3A is a schematic flowchart of a method for processing configuration data according to another embodiment of the present invention.

FIG. 3A is a schematic flowchart of a method for processing configuration data according to another embodiment of the present invention, and as shown in FIG. 3A, the method for processing configuration data in this embodiment may include the following steps:

301: A base station device obtains, through a GPS system installed on the base station device, GPS information of a site where the base station device is located.

302: The base station device obtains an ESN of the base station device by reading information in a designated storage area on the base station device.

303: The base station device sends a DHCP request message for requesting transmission data to a DHCP server, where the DHCP request message includes the GPS information and the ESN.

Figure 3B:
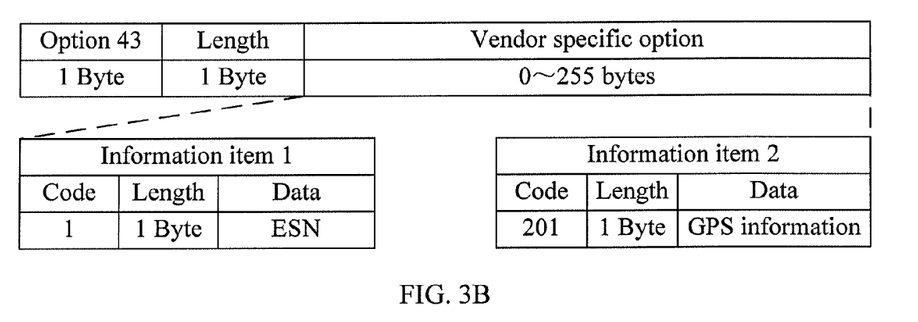
FIG. 3B is a schematic diagram showing a format of an option with an option code 43 in the embodiment corresponding to FIG. 3A.

Specifically, an option of an option code (Option Code) 43, namely, vendor specific information (Vendor Specific Information), in an existing DHCP request message may be used, where an information item code (Information Item Code) field (namely, 1 byte) ranges from 1 to 254, and a length field (namely, 1 byte) has a maximum value of 255, so a total length of the option (namely, the option code 43) cannot exceed 255 bytes. For example, two information items, that is, an Information Item Code 1 and an Information Item Code 201, may be selected to bear the ESN and the GPS information, respectively. Reference may be made to FIG. 3B for an option format of the Option Code 43, and reference may be made to Table 1 for option content of the Option Code 43.

TABLE 1

Option Content of the Option Code 43

| Code value | Length (byte) | Data content | Remarks |
|---|---|---|---|
| 1 | 20 | ESN | Combination of ASCII code character strings, numbers, and letters; |
| 201 | 20 | GPS information | Structure and meaning of the GPS information:<br>typedef struct<br>{<br>    UINT8 ucLatDrct; /* latitude: district 0: north; 1: south*/<br>    UINT8 ucLatDegree; /* latitude: degree*/<br>    UINT8 ucLatMinute; /* latitude: minute*/<br>    UINT8 ucReserved1; /* reserved byte*/<br>    UINT16 uwLatSecond; /* latitude: second × 100, indicating that the accuracy supported by a second is two decimal places*/<br>    UINT8 ucLongDrct; /* longitude: district 0: east; 1: west*/<br>    UINT8 ucLongDegree; /* longitude: degree*/<br>    UINT8 ucLongMinute; /* longitude: minute*/<br>    UINT8 ucReserved2; /* reserved byte*/<br>    UINT16 uwLongSecond; /* longitude: second × 100, indicating that the accuracy supported by a second is two decimal places*/<br>    UINT8 ucAltDrct; /* altitude: district 0: higher than the sea level; 1: lower than the sea level*/<br>    UINT8 ucReserved3[3]; /* reserve 3 bytes*/<br>    UINT32 ulAltitude; /* altitude: meter * 1000, indicating that the accuracy of the altitude is 3 decimal places (mm)*/<br>}GPS_POSITION_STRU;<br>Note: A byte is reserved for alignment of four bytes. |

304: The DHCP server allocates transmission data to the base station device, and sends the GPS information and the ESN to the network management system.

305: The network management system obtains configuration data corresponding to the GPS information according to a correspondence between the GPS information and the configuration data.

Optionally, the network management system may further store the ESN, and associate the ESN with the configuration data, so as to identify the base station device in a subsequent management process. For example, if the base station device is not moved, after the base station device is restarted and applies to the network management system for the configuration data again, the base station device does not need to send the GPS information to the network management system; the network management system can obtain the configuration data corresponding to the ESN according to a correspondence between the ESN and the configuration data, and send the configuration data to the base station device.

306: The DHCP server sends a DHCP response message to the base station device, where the DHCP response message includes the allocated transmission data.

307: The base station device interacts with the network management system by using the obtained transmission data, and obtains the obtained configuration data sent by the network management system according to the ESN.

308: The base station device performs a corresponding configuration operation by using the obtained configuration data.

In this embodiment, after obtaining the GPS information of the site where the base station device is located and the ESN of the base station device, the base station device sends the obtained GPS information and ESN to the network management system, so that the base station device can receive the configuration data corresponding to the GPS information, where the configuration data is obtained by the network management system according to the correspondence between the GPS information and the configuration data and is sent by the network management system. Therefore, the following problem in the prior art can be prevented: manual operations are error-prone and take a long operation time, thereby improving the reliability and efficiency of the base station device in obtaining the configuration data.

Figure 4A:
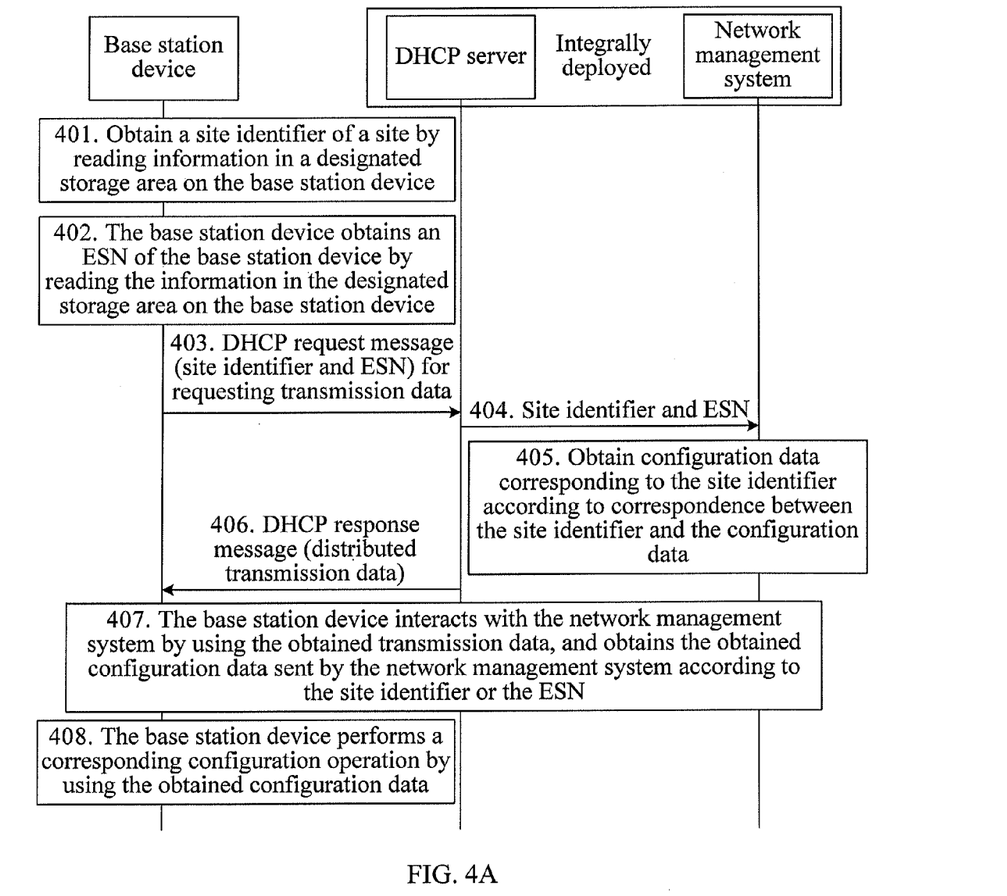
FIG. 4A is a schematic flowchart of a method for processing configuration data according to another embodiment of the present invention.

FIG. 4A is a schematic flowchart of a method for processing configuration data according to another embodiment of the present invention, and as shown in FIG. 4A, the method for processing configuration data in this embodiment may include the following steps:

401: A base station device obtains a site identifier of a site by reading information in a designated storage area on the base station device.

Specifically, the site identifier of the site is pre-configured on the base station device, and reference may be made to related content in the embodiment corresponding to FIG. 1 or FIG. 2 for a specific configuration method, which is not described herein again.

402: The base station device obtains an ESN of the base station device by reading the information in the designated storage area on the base station device.

403: The base station device sends a DHCP request message for requesting transmission data to a DHCP server, where the DHCP request message includes the site identifier and the ESN.

Figure 4B:
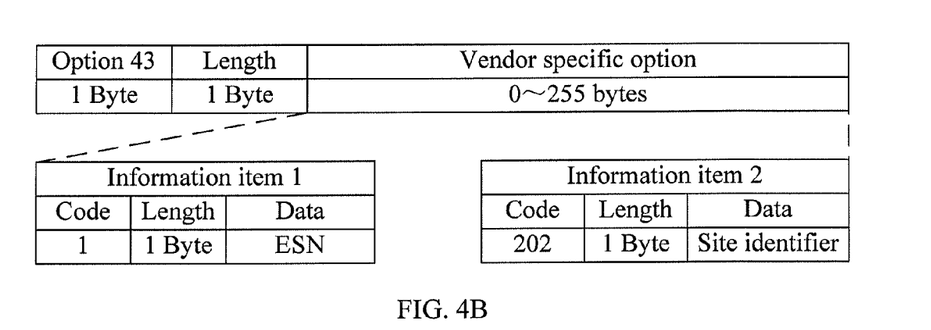
FIG. 4B is a schematic diagram showing a format of an option with an option code 43 in the embodiment corresponding to FIG. 4A.

Specifically, an option of an option code (Option Code) 43, namely, vendor specific information (Vendor Specific Information), in an existing DHCP request message may be used, where an information item code (Information Item Code) ranges from 1 to 254, and a length field (namely, 1 byte) has a maximum value of 255, so a total length of the option (namely, the option code 43) cannot exceed 255 bytes. For example, two information items, that is, an Information Item Code 1 and an Information Item Code 202, may be selected to bear the ESN and the site identifier, respectively. Reference may be made to FIG. 4B for an option format of the Option Code 43, and reference may be made to Table 2 for option content of the Option Code 43.

TABLE 2

Option Content of the Option Code 43

| Code value | Length (byte) | Data content | Remarks |
| --- | --- | --- | --- |
| 1 | 20 | ESN | Combination of ASCII code character strings, numbers, and letters |
| 202 | 20 | Site identifier | Combination of ASCII code character strings, numbers, and letters |

404: The DHCP server allocates transmission data to the base station device, and sends the site identifier and the ESN to the network management system.

405: The network management system obtains configuration data corresponding to the site identifier according to a correspondence between the site identifier and the configuration data.

Optionally, the network management system may further store the ESN, and associate the ESN with the configuration data, so as to identify the base station device in a subsequent management process. For example, if the base station device is not moved to other sites, after the base station device is restarted and applies to the network management system for the configuration data again, the base station device does not need to send the site identifier to the network management system; the network management system can obtain the configuration data corresponding to the ESN according to a correspondence between the ESN and the configuration data, and send the configuration data to the base station device.

406: The DHCP server sends a DHCP response message to the base station device, where the DHCP response message includes the allocated transmission data.

407: The base station device interacts with the network management system by using the obtained transmission data, and obtains the obtained configuration data sent according to the site identifier or the ESN.

408: The base station device performs a corresponding configuration operation by using the obtained configuration data.

In this embodiment, after obtaining the site identifier of the site where the base station device is located and the ESN of the base station device, the base station device sends the obtained site identifier and ESN to the network management system, so that the base station device can receive the configuration data corresponding to the site identifier, where the configuration data is obtained by the network management system according to the correspondence between the site identifier and the configuration data and is sent by the network management system. Therefore, the following problem in the prior art can be prevented: manual operations are error-prone and take a long operation time, thereby improving the reliability and efficiency of the base station device in obtaining the configuration data.

It should be noted that, for brevity, the foregoing method embodiments are represented as a series of actions. But a person skilled in the art should understand that the present invention is not limited to the order of the described actions, because according to the present invention, some steps may adopt other order or occur simultaneously. It should be further understood by a person skilled in the art that the described embodiments all belong to exemplary embodiments, and the involved actions and modules are not necessarily required by the present invention.

In the foregoing embodiments, the description of each of the embodiments has their respective focuses. For a part that is not described in detail in a certain embodiment, reference may be made to related descriptions in other embodiments.

Figure 5:
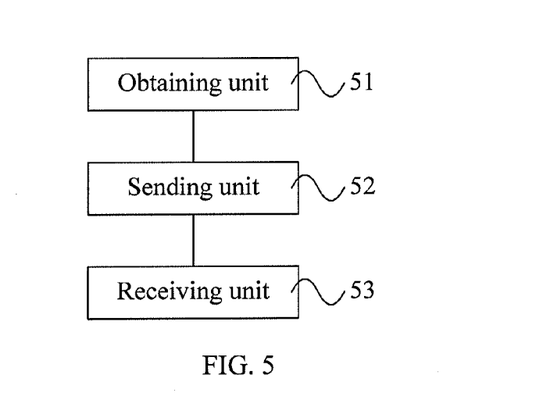
FIG. 5 is a schematic structural diagram of a base station device according to another embodiment of the present invention.

FIG. 5 is a schematic structural diagram of a base station device according to another embodiment of the present invention, and as shown in FIG. 5, the base station device in this embodiment may include an obtaining unit 51, a sending unit 52, and a receiving unit 53. The obtaining unit 51 is configured to obtain site identifier information of a site where the base station device is located; the sending unit 52 is configured to send the site identifier information to a network management system; and the receiving unit 53 is configured to receive configuration data corresponding to the site identifier information and sent by the network management system, where the configuration data is obtained by the network management system according to a correspondence between the site identifier information and the configuration data.

Functions of the base station device in the foregoing embodiments corresponding to FIG. 1, FIG. 3A, and FIG. 4A may all be implemented by the base station device provided in this embodiment, and reference may be made to related content in the foregoing embodiments for detailed description.

The site identifier information obtained by the obtaining unit 51 in this embodiment may include but is not limited to:

GPS information of the site and a device identifier of the base station device; or a site identifier of the site; or a site identifier of the site and a device identifier of the base station device; where the site identifier of the site is pre-configured on the base station device.

Specifically, the sending unit 52 in this embodiment may specifically send the site identifier information to the network management system through a DHCP server.

For example, the sending unit 52 may send a DHCP request message for requesting transmission data to the DHCP server, so as to obtain the transmission data allocated by the DHCP server to the base station device, where the DHCP request message includes the site identifier information, so that the DHCP server sends the site identifier information to the network management system.

For another example, the sending unit 52 may further send a DHCP request message for requesting transmission data to the DHCP server, so as to obtain the transmission data allocated by the DHCP server to the base station device, and send the site identifier information to the network management system by using the obtained transmission data.

In this embodiment, in the base station device, after the obtaining unit obtains the site identifier information of the site where the base station device is located, the sending unit sends the obtained site identifier information to the network management system, so that the receiving unit can receive the configuration data corresponding to the site identifier information, where the configuration data is obtained by the network management system according to the correspondence between the site identifier information and the configuration data and is sent by the network management system. Therefore, the following problem in the prior art can be prevented: manual operations are error-prone and takes a long operation time, thereby improving the reliability and efficiency of the base station device in obtaining the configuration data.

Figure 6:
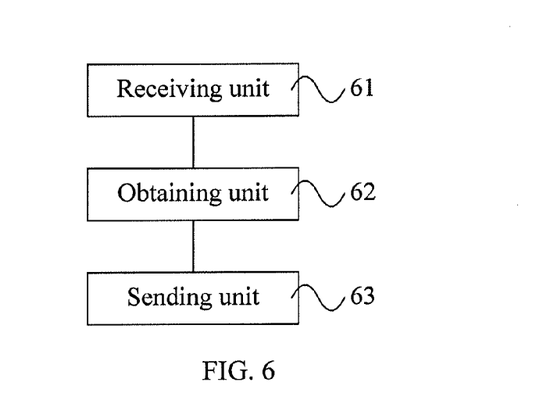
FIG. 6 is a schematic structural diagram of a network management system according to another embodiment of the present invention.

FIG. 6 is a schematic structural diagram of a network management system according to another embodiment of the present invention, and as shown in FIG. 6, the network management system in this embodiment may include a receiving unit 61, an obtaining unit 62, and a sending unit 63. The receiving unit 61 is configured to receive site identifier information of a site where a base station device is located that is sent by the base station device; the obtaining unit 62 is configured to obtain configuration data corresponding to the site identifier information received by the receiving unit 61 according to a correspondence between the site identifier information and the configuration data; and the sending unit 63 is configured to send the configuration data obtained by the obtaining unit 62 to the base station device.

Functions of the network management system in the embodiments corresponding to FIG. 2, FIG. 3A, and FIG. 4A may all be implemented by the network management system provided in this embodiment, and reference may be made to related content in the embodiments for detailed description.

The site identifier information received by the receiving unit 61 in this embodiment may include but is not limited to:

GPS information of the site and a device identifier of the base station device; or a site identifier of the site; or a site identifier of the site and a device identifier of the base station device; where the site identifier of the site is pre-configured on the base station device.

Specifically, the receiving unit 61 in this embodiment may specifically receive, through a DHCP server, the site identifier information sent by the base station device.

For example, the receiving unit 61 may specifically receive the site identifier information sent by the DHCP server, where the site identifier information is included in a DHCP request message for requesting transmission data, sent by the base station device, and received by the DHCP server.

For example, the receiving unit 61 may further specifically receive the site identifier information sent by the base station device, where the site identifier information is sent by using transmission data that is obtained in the case that the base station device sends a DHCP request message for requesting transmission data to the DHCP server to obtain the transmission data allocated by the DHCP server to the base station device.

The DHCP server and the network management system may be integrally deployed or separately deployed, which is not limited in this embodiment.

In this embodiment, in the network management system, after the base station device obtains the site identifier information of the site where the base station device is located, the receiving unit receives the obtained site identifier information sent by the base station device, and then the obtaining unit obtains the configuration data corresponding to the site identifier information according to the correspondence between the site identifier information and the configuration data, and the sending unit sends the configuration data to the base station device. Therefore, the following problem in the prior art can be prevented: manual operations are error-prone and take a long operation time, thereby improving the reliability and efficiency of the base station device in obtaining the configuration data.

A person skilled in the art may clearly understand that, for the purpose of convenient and brief description, for a detailed working process of the system, apparatus, and unit described above, reference may be made to corresponding process in the method embodiments, and details will not be described herein again.

In the embodiments provided in the present application, it should be understood that the disclosed system, apparatus, and method may be implemented in other modes. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be allocated on multiple network units. A part or all of the units may be selected according to an actual need to achieve the objectives of the solutions of the embodiments.

In addition, functional units in the embodiments of the present invention may be integrated into one processing unit, or each of the units may exist alone physically, or two or more units are integrated into one unit. The integrated unit may be implemented through hardware, or may also be implemented in a form of hardware plus a software functional module.

The integrated unit implemented in the form of software functional unit may be stored in a computer readable storage medium. The software functional unit is stored in a storage medium, and contains several instructions used to instruct computer equipment (for example, a personal computer, a server, or network equipment) to perform the steps of the methods according to the embodiments of the present invention. The storage medium includes: any medium that can store program codes, such as a U disk, a removable hard disk, a read-only memory (ROM, Read-Only memory), a random access memory (RAM, Random Access Memory), a magnetic disk, or an optical disk.

Finally, it should be noted that the above embodiments of the present invention are merely intended for describing the technical solutions of the present invention other than limiting the present invention. Although the present invention is described in detail with reference to the foregoing embodiments, persons of ordinary skill in the art should understand that they may still make modifications to the technical solution described in the foregoing embodiments or make equivalent substitutions to some technical features thereof, without departing from the spirit and scope of the technical solution of the embodiments of the present invention.

What is claimed is:

1. A method for obtaining configuration data, comprising:
    obtaining, by a base station device, site identifier information of a site where the base station device is located, wherein the site identifier information comprises Global Positioning System (GPS) information of the site and a device identifier of the base station device;
    sending, by the base station device, the site identifier information to a network management system, such that the network management system obtains configuration data corresponding to the GPS information according to a correspondence between the GPS information and the configuration data, and such that the network management system associates the device identifier with the configuration data, and sending the site identifier information to the network management system through a dynamic host configuration protocol (DHCP) server, wherein the sending, by the base station device, the site identifier information to the network management system through the DHCP server comprises:
        sending, by the base station device, a DHCP request message for requesting transmission data to the DHCP server, so as to obtain transmission data allocated by the DHCP server to the base station device, wherein the DHCP request message comprises the site identifier information, so that the DHCP server sends the site identifier information to the network management system;
    receiving, by the base station device, the configuration data corresponding to the GPS information sent by the network management system;
    if the base station device is not moved and is restarted, sending, by the base station device, the device identifier of the base station device to the network management system, such that the network management system obtains the configuration data according to an association between the device identifier and the configuration data; and
    receiving, by the base station device, the configuration data that is associated with the device identifier and is sent by the network management system.

2. The method according to claim 1, wherein the DHCP server and the network management system are separately deployed.

3. A method for providing configuration data, comprising:
    receiving, by a network management system, site identifier information of a site where a base station device is located that is sent by the base station device, wherein the site identifier information comprises Global Positioning System (GPS) information of the site and a device identifier of the base station device, and receiving through a dynamic host configuration protocol (DHCP) server, the site identifier information sent by the base station device, wherein the receiving, by the network management system through the DHCP server, the site identifier information of the site where the base station device is located that is sent by the base station device comprises:
        receiving, by the network management system, the site identifier information sent by the DHCP server, wherein the site identifier information is comprised in a DHCP request message for requesting transmission data, and the request message is sent from the base station device to the DHCP server;
    obtaining, by the network management system, configuration data corresponding to the GPS information according to a correspondence between the GPS information and the configuration data;
    associating, by the network management system, the device identifier with the configuration data;
    sending, by the network management system, the obtained configuration data to the base station device;
    receiving, by the network management system, the device identifier sent by the base station device;
    obtaining, by the network management system, the configuration data according to an association between the device identifier and the configuration data; and
    sending, by the network management system, the configuration data associated with the device identifier to the base station device.

4. The method according to claim 3, wherein the DHCP server and the network management system are separately deployed.

5. A base station device, comprising:
    an obtaining unit, configured to obtain site identifier information of a site where the base station device is located, wherein the site identifier information comprises Global Positioning System (GPS) information of the site and a device identifier of the base station device;
    a sending unit, configured to send the site identifier information to a network management system, such that the network management system obtains configuration data corresponding to the GPS information according to a correspondence between the GPS information and the configuration data, and such that the network management system associates the device identifier with the configuration data, and send the site identifier information to the network management system through a dynamic host configuration protocol (DHCP) server, wherein the site identifier information is comprised in a DHCP request message for requesting transmission data, and the request message is sent from the base station device to the DHCP server; and
    a receiving unit, configured to receive the configuration data corresponding to the GPS information sent by the network management system;
    wherein
    the sending unit is further configured to send, if the base station device is not moved and is restarted, the device identifier of the base station device to the network management system, such that the network management system obtains the configuration data according to an association between the device identifier and the configuration data; and the receiving unit is further configured to receive the configuration data that is associated with the device identifier and is sent by the network management system.

6. The base station device according to claim 5, wherein the sending module is specifically configured to:

send a DHCP request message for requesting transmission data to the DHCP server, so as to obtain transmission data allocated by the DHCP server to the base station device, wherein the DHCP request message comprises the site identifier information, so that the DHCP server sends the site identifier information to the network management system.

7. A network management system, comprising:

a receiving unit, configured to receive site identifier information of a site where a base station device is located that is sent by the base station device, wherein the site identifier information comprises Global Positioning System (GPS) information of the site and a device identifier of the base station device, and receive through a dynamic host configuration protocol (DHCP) server, the site identifier information sent by the base station device, wherein the site identifier information is comprised in a DHCP request message for requesting transmission data, and the request message is sent from the base station device to the DHCP server;

an obtaining unit, configured to obtain configuration data corresponding to the GPS information according to a correspondence between the GPS information and the configuration data;

an association unit, configured to associate the device identifier with the configuration data; and a sending unit, configured to send the configuration data obtained by the obtaining unit to the base station device;

wherein the receiving unit is further configured to receive the device identifier sent by the base station device;

the obtaining unit is further configured to obtain the configuration data according to an association between the device identifier and the configuration data obtained by the association unit; and the sending unit is further configured to send the configuration data associated with the device identifier to the base station device.

8. The method according to claim 1, wherein the configuration data comprises at least one of an IP address, a working frequency point, a board slot and an interface rate.

9. The method according to claim 3, wherein the configuration data comprises at least one of an IP address, a working frequency point, a board slot and an interface rate.

10. The base station device according to claim 5, wherein the configuration data comprises at least one of an IP address, a working frequency point, a board slot and an interface rate.

* * * * *